United States Patent Office 3,846,289
Patented Nov. 5, 1974

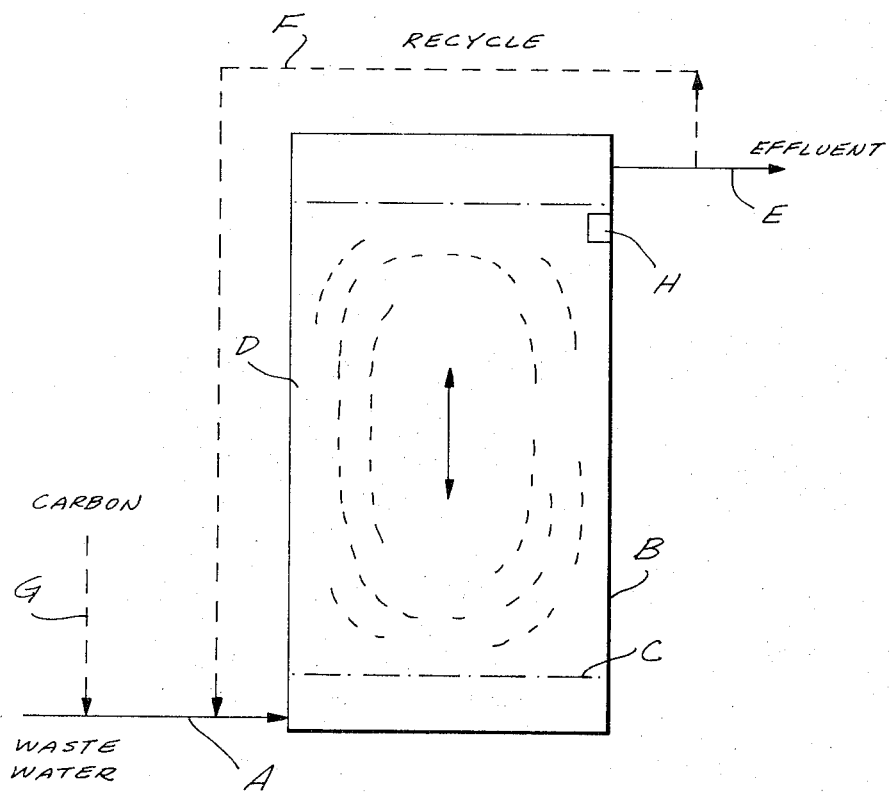

3,846,289
WASTE TREATMENT PROCESS
John S. Jeris, Yonkers, and Carl Beer, Sand Lake, N.Y., and James A. Mueller, Teaneck, N.J., assignors to Ecolotrol, Inc., Bethpage, N.Y.
Filed June 19, 1972, Ser. No. 264,346
Int. Cl. C02c 1/04
U.S. Cl. 210—8                                6 Claims

ABSTRACT OF THE DISCLOSURE

A process for denitrifying waste water includes generating a fluidized bed containing denitrifying biota on a particulate carrier, metering a carbon source into the waste water and mechanically removing excess bacterial growth from the carrier at predetermined intervals.

BACKGROUND OF THE INVENTION

The invention relates to a process for the biological treatment of liquid wastes using fluidized beds. In particular, it is directed to a process for denitrifying waste water.

Traditionally, sewage treatment plants were designed to remove solids and oxygen-demanding organic material. The plants were not intended to remove algal nutrients such as nitrogen or phosphorous. With the large amounts of fixed nitrogen in the form of ammonia and nitrates that are being introduced into the biosphere by the large scale use of synthetic detergents and fertilizers, and with the demands man makes on his environment owing to population congestion, there definitely appears to be an imbalance developing in our ecological system that may have long range consequences for future generations. Today, municipal wastes generally contain from 25 to 50 milligrams of nitrogen per liter, in the form of ammonia, amines, nitrate, nitrite and the like. The presence of such nutrients in natural waters causes fertilization and vegetative growth in the form of algal blooms. Such blooms often result in accelerated eutrophication.

Traditional sewage treatment processes such as the activated sludge process and trickling filtration can produce effluents with high nitrate concentrations. Further, agricultural run-off contains high concentration of nitrates. Accordingly, there exists an urgent need to reduce the quantity of nitrates and nitrites in waste water prior to returning the water to the natural environment.

Denitrification processes conducted on experimental bases generally involve nitrifying the effluent from contemporary secondary treatment plants to oxidize amines and ammonia to nitrate. The nitrified wastes are then subjected to the action of denitrifying biota which convert the nitrates to nitrites and then to nitrogen gas. The nitrogen gas is then exhausted from the waste water. A carbon source is present during denitrification. As the nitrate nitrogen is reduced to the gaseous nitrogen molecule, a carbon source is oxidized to carbon dioxide and cellular material is also formed.

Traditional denitrification processes require an unusually long detention time, usually ranging from 2 to 4 hours. Such detention times require large and expensive facilities for treatment of industrial or municipal sewage.

Certain experimental denitrification processes have employed downflow column or beds. Such downflow beds or packed beds tend to become blocked as solids in the waste water are filtered out and further as attached biota undergo uncontrolled growth on the substrate stones or sand. Such blockage causes insurmountable head losses. These losses must be relieved by frequent and impractical back washing.

Generally, upflow expanded beds containing activated carbon have been employed for the removal of small amounts of carbon or biochemical oxygen demand (BOD) that remain after biological treatment or physical/chemical treatment. Biological denitrification has been observed in activated carbon beds operated at a low velocity of approach, approximately 5 gallons per minute per square foot of bed. However, up to now, upflow bacterial denitrification has been regarded as an undesirable phenomenon resulting in formation of uncontrolled biological growth which serves to inhibit or impede the primary function of the bed, the removal of carbon in waste water. Further, only insignificant or inconsequential quantities of nitrogen have been removed from waste water in such processes.

A significant defect in all the prior art experimentation with regard to denitrification of nitrified waste water lies in a failure to remove well over 90% of nitrates, while operating at high flow rates and very low detention times, without plugging.

As employed in the application the term "waste water" or liquid waste includes organic or inorganic liquids or mixtures thereof containing biologically decomposable contaminants and containing the equivalent of at least about 15 milligrams per liter of nitrogen in an oxidized form; particularly the nitrate and/or nitrite form. Municipal and industrial waste waters which have undergone nitrification or contain oxidized nitrogen in the above amounts fall within the above definition of waste water.

SUMMARY OF THE INVENTION

It is, therefore, a primary object of the invention to provide a process for treating waste water to reduce nitrogen content employing high flow rates and low detention times while maintaining a high removal efficiency.

It is another object of the invention to efficiently denitrify waste water containing significant amounts of suspended solids without effectively reducing the efficiency of the process.

Other objects and advantages will become apparent from the following detailed discussion of the invention.

The above and other objects are met in a process for denitrifying waste water comprising the steps of generating a fluidized bed from denitrifying biota attached to a solid particulate carrier and the waste water, said carrier having a particle size of from about 0.2 to 3 millimeters and a specific gravity of at least about 1.1; providing sufficient amounts of carbon source in said waste water to allow nitrified wastes to be converted to nitrogen by said biota; maintaining said bed at a temperature sufficient to permit bacterial activity; and mechanically removing excess growth from said particulate carrier at predetermined intervals.

The term "fluidized bed" as employed herein refers to the flow of a suitable liquid upwardly through a bed of suitably sized, solid particles at a velocity sufficiently high to buoy the particles, to overcome the influence of gravity, and to impart to them an appearance of movement within a bed expanded to a greater depth than when no flow is passing through the bed.

As nitrogen in the form of nitrates and/or nitrites is removed from waste water passing through the fluidized bed, bacterial growth is enhanced and, if unchecked, the size increases and aggregates of carrier-supported biota tend to form thus reducing the surface area and the efficiency of the column. Further, the particles tend to be reduced in specific gravity as they expand and tend to be carried away from the bed. It is a feature of the present process that at periodic intervals excess bacterial growth is removed from the particles, thereby leaving sufficient growth for denitrification.

The use of a fluidized bed for denitrification also permits waste water to be treated wherein such water contains substantial amounts of suspended matter. Such suspended matter generally readily passes through the fluidized bed. Packed beds are subject to plugging by excess growth and by retention of particulate matter contained in waste water. By the above process it is also possible to efficiently denitrify waste water at unexpectedly high flow rates and low detention times.

DESCRIPTION OF PREFERRED EMBODIMENTS

While applicable to the treatment of any fluid having oxidized nitrogen and not toxic to denitrifying bacteria, the present process is readily adapted to augment secondary treatment systems. The liquid effluent from trickling filtration plants or activated sludge processes contain a variety of nitrogenous compounds, including ammonia, amines, nitrates, nitrites and the like. Effluents high in ammonia or amines may be subjected to oxidation and/or the use of aerobic bacteria to convert ammonia or amines to nitrates or nitrites. For practical applications the waste water to be treated contains at least the equivalent of about 15 milligrams per liter of nitrogen in an oxidized state. The waste water is passed through an upflow expanded or fluidized bed according to the invention in the presence of denitrifying bacteria, such as pseudomonas. The nitrates and/or nitrites are converted to inert nitrogen gas and/or cellular material.

While the following discussion is primarily directed toward the treatment of waste by denitrifying bacteria, including facultative and/or anaerobic bacteria, it should be recognized that the process is applicable to the treatment of waste in the presence of oxygen and/or aerobic bacteria, such as Nitrosomonas or Nitrobacter. In such treatment waste water containing amines or ammonia may be nitrified and the nitrified wastes thereafter pass into the denitrifying systems. In general, operation of the nitrifying fluidized bed will parallel that of the denitrifying fluidized bed with appropriate obvious modifications. For example, a separate carbon source need not be added to the waste water prior to nitrification.

The fluidized bed through which the influent waste water is passed is preferably contained in an upright cylindrical column. Waste water enters the column through a distribution manifold in its base. A cylindrical manifold plate having a series of spaced apart holes may be employed in order to regulate and even the flow of waste water through the column although a wide assortment of conventional distribution devices and systems are utilizable.

To perform the process a fluidized bed formed from denitrifying biota attached to a solid particulate carrier or substrate is generated. Suitable carrier materials include natural or artificial materials such as coal, volcanic cinders, glass or plastic beads, sand, alumina and, most preferably, activated carbon particles. The size of the particles is a function of both their specific gravity and surface area. For the most part it is preferred to employ carrier particles between about 0.2 and 3 millimeters in diameter. In particular, it is most preferable to employ porous particles between 0.6 and 1.7 millimeters in diameter (assuming spherical particles). Most preferably, the particles are of a uniform size. While the above bed carrier materials are illustrative of the preferred bed carrier materials which are useful, other materials nontoxic to the bacteria, whether natural or synthetic, can be employed.

For optimum denitrification each bed particle preferably has a thin layer of bacteria seeded thereon. Generally, the bed particles are first cultured to seed bacteria, such as pseudomonas, thereon. Seeding is provided externally or, preferably, internally of the system employing conventional procedures. Common denitrifyers can be present, such as pseudomonas, bacillus, and/or micrococcus. The specific gravity of such seeded particles must be no less than about 1.1 and preferably greater than about 1.20 in order to insure that such particles are not carried out of the system during operation.

In one aspect of operation the bed particles are loaded into an upright denitrification column. A carbon source, if needed, is metered into the feed solution. If the influent feed contains sufficient quantities of biologically available organic carbon, then no external carbon source need be employed. The nitrified feed is then pumped into the column at a rate sufficient to support the second particles in the state of fluidization as hereinabove described.

The pressure of the feed at the point of fluidization will vary depending on many factors, including the quantity of bed particles and their specific gravity. It has been found that enhanced results are obtained, when the flow rate is from about 6 to 40 gallons per minute per square foot of natural or artificial bed. Particularly enhanced results are obtained when the flow rate is from about 8 to 25 gallons per minute per square foot of bed. Depending upon the flow rate selected, the actual dwell time within a specified column can be as little as from three to five minutes.

In a given bed as the flow rate is increased in order to increase the volume of waste water treated, then a specific bed of biota-attached particles will increase in height as the particles separate from each other. In order to compensate for the tendency of the bed to increase in height at higher flow rates, it may be desirable to employ heavier additional bed particles or employ a new bed having particles of higher specific gravity. Employing the identical fluidized bed, tests were made which showed that as the flow rate was increased from about 12 gallons per minute per square foot of bed to about 24 gallons per minute per square foot of bed, the percent expansion of the bed more than doubled. If desired, this effect is counterbalanced by selecting bed particles of higher specific gravity when operating at higher flow rates, such as sand, garnet, or the like.

In general, the pH of the system is adjusted, if need be, to fall in the range of from about 5.5 to 9.5. Enhanced results are obtained and, accordingly, it is preferred to operate at a pH from about 6.5 to 8.5. The temperature of the fluidized bed environment should be sufficient to permit bacterial activity. Usually, the bed temperature is kept at from about 5 to 45° C. Of course, the temperature will vary with that of the influent waste water and, accordingly, ambient operating temperatures in the order of from 10 to 25° C. are satisfactory.

There must be sufficient levels of carbon in the feed influent in order to provide stoichiometric amounts of carbon to permit oxidized nitrogen to be reduced to nitrogen. Of course, if the influent feed contains such stoichiometric amounts (as set forth hereinafter) of organic carbon, such adjustment may not be necessary. Generally, any inexpensive and readily available carbon source can be employed. Preferred carbon sources include starch, glucose and, most preferably, methanol. The carbon source is added to the influent feed prior to denitrification. Where the carbon source is methanol it has been postulated that the following denitrification reaction occurs:

$$NO_3^- + \tfrac{5}{6}CH_3OH \rightarrow \tfrac{1}{2}N_2 + \tfrac{5}{6}CO_2 + \tfrac{7}{6}H_2O + OH^-$$

Sufficient carbon must be present to satisfy this stoichiometric minimum calculated in light of the amounts of nitrate nitrogen or an equivalent in the feed plus the quantity of carbon required for growth of new microorganisms and that required to biologically reduce the dissolved oxygen present in the influent. Generally 2.5 to 3 milligrams of methanol are required per mg. nitrate nitrogen removed.

As the denitrification reaction proceeds in the expanded bed, bacteria tend to grow on the surface of the carrier particles. After a time, if unchecked, bed particles tend to form thick layers and expand to the extent that they form agglomerates, and/or gelatinous masses. Should this be permitted to occur, then the surface area available for denitrification is greatly reduced and the efficiency of the process is correspondingly reduced. Further, agglomerates tend to be carried out of the expanded bed as their specific gravity decreases. They also tend to entrap or become attached to gas bubbles, such as those from the nitrogen gas liberated by the denitrification reaction. The gas bubbles reduce the specific gravity of the agglomerates and tend to carry them away from the bed toward the top of the column where they can collect as an undesirable floc or leave the system.

In order to overcome these problems excess bacterial growth is mechanically removed from the particles. Sufficient growth in the form of a thin layer of bacteria must remain on the particles in order to preserve the efficiency of the process. Removing all growth, which is suggested for upflow expanded bed processes used for treating waste water to remove carbon, destroys the efficiency of the present process. To remove the growth, predetermined quantities of bed particles may be removed from the column by a valve-controlled outlet port and mechanically agitated and abraded to remove excess bacteria. This operation may be performed in a separate abrasion vessel employing a mixer which resembles the rotating knife in a Waring Blender. The abraded particles are then returned to the bottom of the fluidized bed. Alternately, the particles in the abrasion vessel are subjected to the action of compressed air or water sprays to remove excess biota.

Other suitable agitation mechanisms and apparatus will be apparent to those skilled in the art. After treatment, the abraded particles are metered into the expanded bed at its base by use of a suitable inlet port. The withdrawal of measured amounts of bed particles, their cleaning and recycling into the process can be accomplished without significant interference with the continuity of the process.

In a second and more preferred embodiment, the particles are treated in situ in order to remove excess bacteria from their outer surfaces. This treatment can also serve to separate nitrogen gas bubbles formed in the bed and thus reduce loss particles from the bed. Compressed air is preferably directed through the bed, although a variety of mechanical agitation apparatus can be employed alone or in combination within the column. For example, mechanical mixers, baffle plates and other abrasion-type surfaces, water jets directed upwardly and sidewardly against the column walls to create vortices and the like, as well as other suitable conventional agitating means can be employed within the column.

It has been found that when sufficient growth is removed, the height of the expanded bed after treatment is reduced on the order of from about 10 to 20 percent of its original expanded length at the same flow rate. At highly elevated or reduced flow rates, the height may be somewhat above or below the range respectively. For removal of excess growth in situ using the air cleaning method, for example, the flow rate to the column may be reduced to about ¼ normal flow. The bed will settle to a new lower height. During and immediately after abrasion, the removed growth particles are carried out of the reactor and exhausted from the system. Thereafter, the flow rate may be increased to its normal velocity.

Depending upon the nature of the waste water treated in the fluidized bed, it may be necessary to employ more than one column connected in series for efficient denitrification. For most purposes, however, a single column will suffice. It has been found practical to employ the effluent from the first column as the influent feed for a second column, where the concentration of nitrites in the effluent is excessive. In the second column such nitrites are further reduced to nitrogen gas. During start-up, it has been found useful to recycle at least a portion of the effluent treated to the column in order to promote initial growth of bacteria on the bed carrier particles in situ.

In the accompanying drawing a somewhat preferred embodiment of the process is illustrated. Waste water A is introduced into the lower portion of cylindrical column B through a pressure manifold C in the base of the column. Biota seeded bed particles are fluidized by the passage of waste water through the column and form a denitrification fluidized bed D. Denitrified waste water E is exhausted from the column after passage through the denitrifying bed. Selected portions of the effluent are recycled F as required to the influent waste water feed to promote growth of the biota on the particles. A carbon source G is metered into the waste water influent in sufficient amounts to satisfy the biological reaction for the reduction of nitrogen, as nitrates, in the waste water.

The metering of sufficient amounts of a carbon source may be conducted automatically by providing a conventional nitrogen analyzer which is adapted to periodically sample the influent waste water and determine its oxidized nitrogen content. Provision can be made for metering in a carbon source in response to the output of the nitrogen analyzer along with metering control based on the incoming flow.

During denitrification, bacterial growth on the particles is monitored from the bed expansion by a conventional optical device or other type of solids sensor H which helps to control excess growth. When bed expansion reaches a certain height whereby it reduces light passing through the column to a specified minimum, the bed particles are subjected to the regeneration by abrasion to remove excess growth.

The following examples are illustrative of the invention and are not limitative of scope:

EXAMPLE I

In order to demonstrate the feasibility of employing a fluidized bed for dentirification of waste water containing substantial amounts of nitrates at elevated flow rates, a pair of biological reactors were constructed. The biological reactors consisted of columns formed from PLEXIGLAS acrylic plastic, each reactor being 12 feet high and 3 inches in inside diameter. Flow entered a bottom PLEXIGLAS manifold plate containing ⅛ inch diameter holes. Initially, the columns contained nine feet of 12× 40 mesh activated carbon, seeded with bacteria associated with common sewage.

A synthetically prepared feed was employed. The feed included tap water. Sodium sulfite was continuously fed into the feed and maintained the dissolved oxygen of the feed at close to zero in order to insure the integrity of the anaerobic process. Varying quantities of sodium nitrate and ammonium chloride, as the nitrogen source, were added.

One reactor was in operation for six months and maintained excellent biological growth. Over 90% nitrogen removal was obtained with influent nitrate-nitrogen concentrations varying from about 17 to 39 milligrams per liter. During the below tabulated test runs, the flow rate of the influent was measured at 8.1 gallons per minute per square foot of bed. The temperature of the bed was 26° C.

Three test runs are presented in tabular form. The runs were conducted at three day intervals. In the table the concentration of nitrogen is in milligrams per liter. Both influent (feed) and effluent were measured for concentration of nitrates and nitrites.

TABLE

| Run number | Nitrate | | Nitrite | | Total nitrogen | | Percent N removed |
|---|---|---|---|---|---|---|---|
| | Feed | Effluent | Feed | Effluent | Feed | Effluent | |
| 1 | 31.6 | 0.3 | 0.2 | 1.9 | 31.8 | 2.2 | 93 |
| 2 | 26.6 | 0.2 | 0.3 | 1.2 | 26.9 | 1.4 | 95 |
| 3 | 17.8 | 0.0 | 0.3 | 1.0 | 18.1 | 1.0 | 94 |

The high rate of nitrogen removal at the substantial flow rate of 8.1 gallons per minute illustrates the efficiency of fluidized bed denitrification. In the column tests, nine feet of activated carbon were employed. During the test the biological growth was permitted to expand without treatment. For evaluation purposes a large quantity of activated carbon was removed from the reactor.

After such removal this height of the bed in the column at zero flow was 6.4 feet. In use the column expanded to 10.8 feet at the operating flow.

EXAMPLE II

In order to evaluate the efficiency of the process at elevated flow rates the denitrification column set forth in Example I was operated at a flow rate of about 12 gallons per minute per square foot of bed for five days. The temperature of the column was 24.0° C. The column had expanded about 78% from its packed state. The average detention time of the waste water in the column was about 6.4 minutes. Tests indicated that the amount of nitrogen removed from the waste water was 30 milligrams per liter.

EXAMPLE III

In order to remove excess growth and reduce the expansion of the bed the following procedure was employed. Denitrification was accomplished according to the procedures set forth in Example I in a column constructed according to Example I. After the bed had been operating for about a week the flow rate was reduced from 8 gallons per minute per square foot to about 4 gallons per minute per square foot. The bed settled to a new reduced height. At that time compressed air was introduced into the reactor for a one minute contact time. The compressed air agitated the bed particles sufficiently to remove excess growth. The excess growth was carried out of the column and exhausted from the system. Sufficient growth was removed so that the height of the expanded bed was reduced by about 15% of its original expanded length.

Waste water was passed through the washed bed at 8 gallons per minute per square foot of bed. Denitrification efficiency was satisfactory. A daily 10 second air backwash provides further enhanced results.

Various modifications in the process can be employed. For anaerobic biological systems, oxygen void gases may be employed to provide additional flow necessary to enhance expansion or fluidization. If desired, auxiliary mixing equipment or pulsing equipment could be employed to maintain necessary particle movement and separation of gaseous bubbles from the carrier within the bed or in the freeboard volume.

In order to reduce the tendency of the bed particles to agglomerate and provide increased mixing within the bed, the denitrification column or reactor can be sub-divided into a number of vertical compartments of small cross-sectional size. At elevated flow rates of at least about 15 gallons per minute per square foot the waste water is braked by the walls within the column. This produces a circulation and mixing of the bed particles. The particles tend to descend at the wall and rise in the middle of the vertical pipes. If desired, further subdivision of the reactor could be accomplished by employing crimped and/or plain plastic sheets.

While certain preferred embodiments have been illustrated hereinabove the invention is not to be limited except as set forth in the following claims.

Wherefore we claim:

1. Process for denitrifying waste water containing nitrified waste passing the waste water through a bed of microorganisms, said bed adapted to pass suspended solids present in said waste therethrough, comprising:
    (a) generating an upflow fluidized bed of denitrifying biota, said biota attached to a solid particulate carrier, said carrier having a particle size from about 0.2 to 3 millimeters and a specific gravity of at least about 1.1, by passing waste water upwardly through said bed at a flow rate of at least about 6 gallons per minute per square foot of bed to buoy the particles to overcome the influence of gravity and to impart to said bed particles movement within the bed;
    (b) providing sufficient amounts of a carbon source in said waste water to allow said nitrified wastes to be converted to nitrogen by said biota;
    (c) maintaining said bed at a temperature sufficient to permit biota activity; and
    (d) removing excess biota growth formed on said carrier during said process such that significant quantities and generally greater than about 90% by weight of said nitrified waste is reduced from a volume of waste water treated in said bed in about 10 minutes or less and floc produced by removal of excess growth is carried from the process without interference with the efficient operation thereof.

2. The invention in accordance with claim 1 in which said carbon source is selected from the group consisting of starch, glucose and methanol.

3. The process in accordance with claim 1 wherein the carrier is a particulate material of a substantially uniform size between about 0.6 and 1.7 millimeters in diameter.

4. The process in accordance with claim 1 in which the carrier is sand.

5. The process in accordance with claim 1 in which a fluidized bed is formed by passing waste water through a vertical column containing denitrifying biota attached to a solid particulate carrier at a flow rate between about 6 and 40 gallons per minute per square foot of bed.

6. Process for denitrifying waste water containing a minimum concentration of at least about 15 milligrams per liter of oxidized nitrogen as nitrified waste, by passing the waste water through a bed of denitrifying anaerobic bacteria, said bed adapted to pass suspended solids present in said waste water therethrough, comprising:
    (a) generating an upflow fluidized bed of said denitrifying bacteria, said bacteria attached to a solid particulate carrier, said carrier having a particle size of about 0.2 to 3 millimeters and a specific gravity of at least about 1.1; by passing said waste water upwardly through a vertical column containing said bed at a flow rate from about six to forty gallons per minute per square foot of bed to impart to said bacteria attached particles movement within the bed;
    (b) providing sufficient carbon in said waste water to allow said nitrified wastes to be converted to nitrogen by said bacteria;
    (c) maintaining said bed at temperature sufficient to permit bacterial activity;
    (d) mechanically removing excess bacterial growth from said bed particles at the downstream portion of said bed in order to increase the specific gravity of said particles, by agitating said particles, thereby shearing off said excess growth, such that amounts greater than about 90% by weight of said nitrified waste is reduced from a volume of waste water treated in said bed in about 10 minutes or less, and floc produced by removal of excess growth is carried from the process without interfering with the efficient operation thereof.

References Cited

UNITED STATES PATENTS 3,709,364  1/1973  Savage _____ 210—196 X

OTHER REFERENCES

St. Amant, P. P., and McCarthy, P. L., *Treatment of High Nitrate Waters*, Journal American Water Works Association, 1969, pp. 659–662.

Weber Jr., W. J., and Morris, J. C., *Kinetics of Adsorption in Columns of Fluidized Media*, Journal Water Pollution Control Federation, 1965, pp. 425–430, 443.

SAMIH N. ZAHARNA, Primary Examiner

B. CASTEL, Assistant Examiner

U.S. Cl. X.R.

210—11, 14, 20